Wallis & Miller,
Corn Harvester.
No. 53,710.  Patented April 3, 1866.
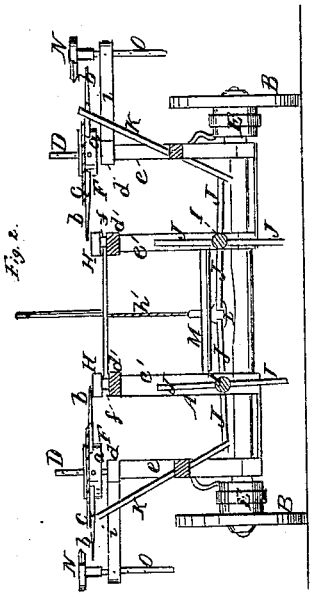
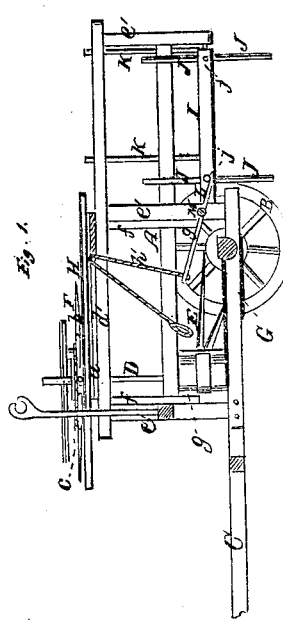
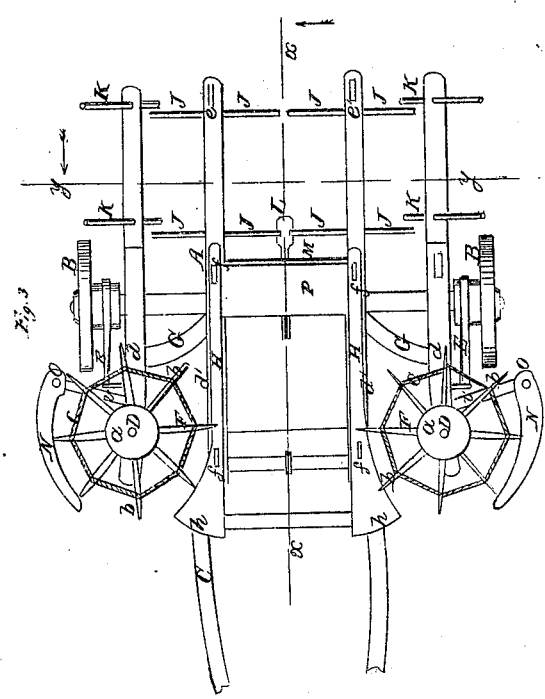
Witnesses
Theo Tusch
C. L. Topliff
Inventor
J. M. Wallis
Elias Miller
By Munn & Co
Attys

UNITED STATES PATENT OFFICE.

J. M. WALLIS AND ELIAS MILLER, OF MILTON, IOWA.

IMPROVEMENT IN CORN-HARVESTERS.

Specification forming part of Letters Patent No. 53,710, dated April 3, 1866.

*To all whom it may concern:*

Be it known that we, J. M. WALLIS and ELIAS MILLER, of Milton, in the county of Van Buren and State of Iowa, have invented a new and Improved Machine for Harvesting Indian Corn; and we do hereby declare that the following is a full, clear, and exact description thereof, which will enable those skilled in the art to make and use the same, reference being had to the accompanying drawings, forming part of this specification, in which—

Figure 1 is a side sectional view of our invention, taken in the line $x\ x$, Fig. 3; Fig. 2, a transverse vertical section of the same, taken in the line $y\ y$, Fig. 3; Fig. 3, a plan or top view of the same.

Similar letters of reference indicate corresponding parts.

This invention relates to a new and improved machine for harvesting Indian corn—that is to say, for cutting down the standing stalks and depositing them in gavels or bundles upon the ground.

A represents the body of the machine, which is mounted on two wheels, B B, and has thills C attached.

D D represent two vertical shafts, which are placed one at each side of the front part of the body A, and are rotated by bands E from the hubs of the wheels B.

On each shaft D there is placed a reel, F, composed of a hub, $a$, having radial arms $b$, connected by a wire, $c$, as shown clearly in Fig. 3, said wire being rather nearer the points of the arms $b$ than the hub $a$.

G G represent cutters, which are secured to the lower part of the body A in line with spaces between longitudinal bars $d\ d'$, which are at the upper ends of uprights $e\ e'$. The bars $d$ and their uprights $e$ form the outer sides of the body A, and the front ends of $d$ project a little obliquely outward, as shown in Fig. 3. The bars $d'$ and the uprights $e'$ form the central part of the body A, and on the bars $d'$ there are placed supplemental bars H H, having pendants $f$ attached to them, which pass down through mortises in the bars $d'$, said pendants admitting of the bars H being adjusted higher or lower, as may be desired, pins $g$ passing through the pendants into any of a series of holes in the uprights $e'$. The front ends of the bars H H are rounded or curved, as shown at $h$ in Fig. 3.

Between the rear uprights, $e'\ e'$, of the bars $d'$ there are placed rotating shafts I I, through which arms J pass, and through the rear parts of the central bars, $d^2$, of the standards $e$ oblique bars K pass, the latter being stationary.

The shafts I I are prevented from turning by means of a bar, L, which passes through a shaft, M, fitted in the central uprights, $e'$, and has a cord, $h'$, attached to the front end. The arms J of the shafts I come in contact with the rear of bar L, and the latter prevents the shafts I from turning.

As the machine is drawn along the horse walks between the rows of corn, the cutters G G coming in contact with the standing stalks at each side, while the reels F F, as they rotate, gather and present the standing stalks properly to the cutters, the guards N and bars H insuring the proper action of the reels. The stalks, as they are cut, fall upon the arms J and bars K, and are there retained until a sufficient quantity accumulates to form a gavel of the required size, when the driver, from his seat P, pulls the the cord $h'$, thereby throwing down the rear of bar L and releasing the arms J, which turn with the shafts I and cause the gavels to drop on the ground.

N N represent guards, which are attached to the upper ends of vertical shafts O, which pass through arms $i$, the latter projecting horizontally from the bars $d$. These guards N N are of curved form, and they are at the outer sides of the reels, just above the arms of the reels.

The reels F may be adjusted higher or lower on their shafts D, and the guards N may also be adjusted higher or lower, and the bars H also, as previously alluded to. This is necessary in order to accommodate the machine to corn of different heights.

Having thus described our invention, we claim as new and desire to secure by Letters Patent—

The bar L, passing through the shaft M, and arranged in relation with the arms J, substantially as and for the purpose specified.

J. M. WALLIS.
ELIAS MILLER.

Witnesses:
J. P. MAISAN,
CHRISTIAN MILLER.